United States Patent Office 3,674,372
Patented July 4, 1972

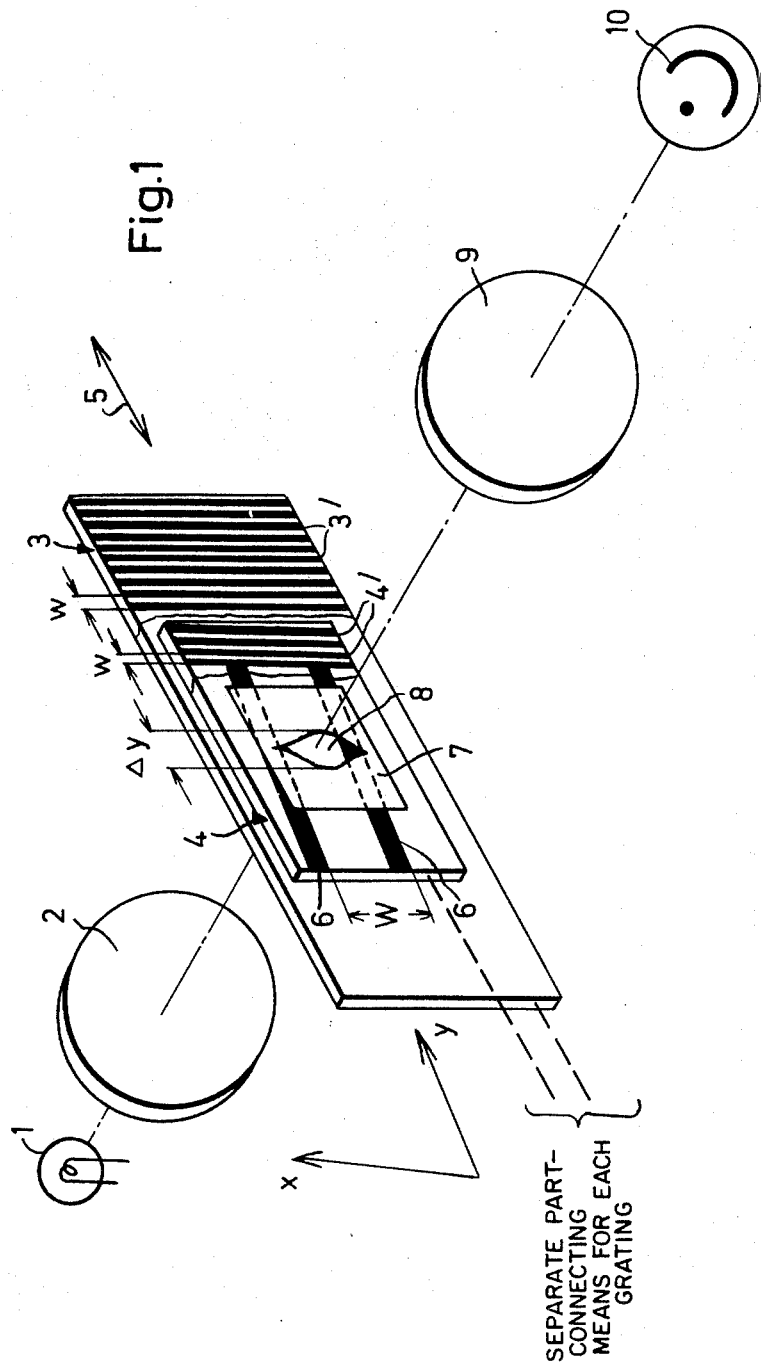

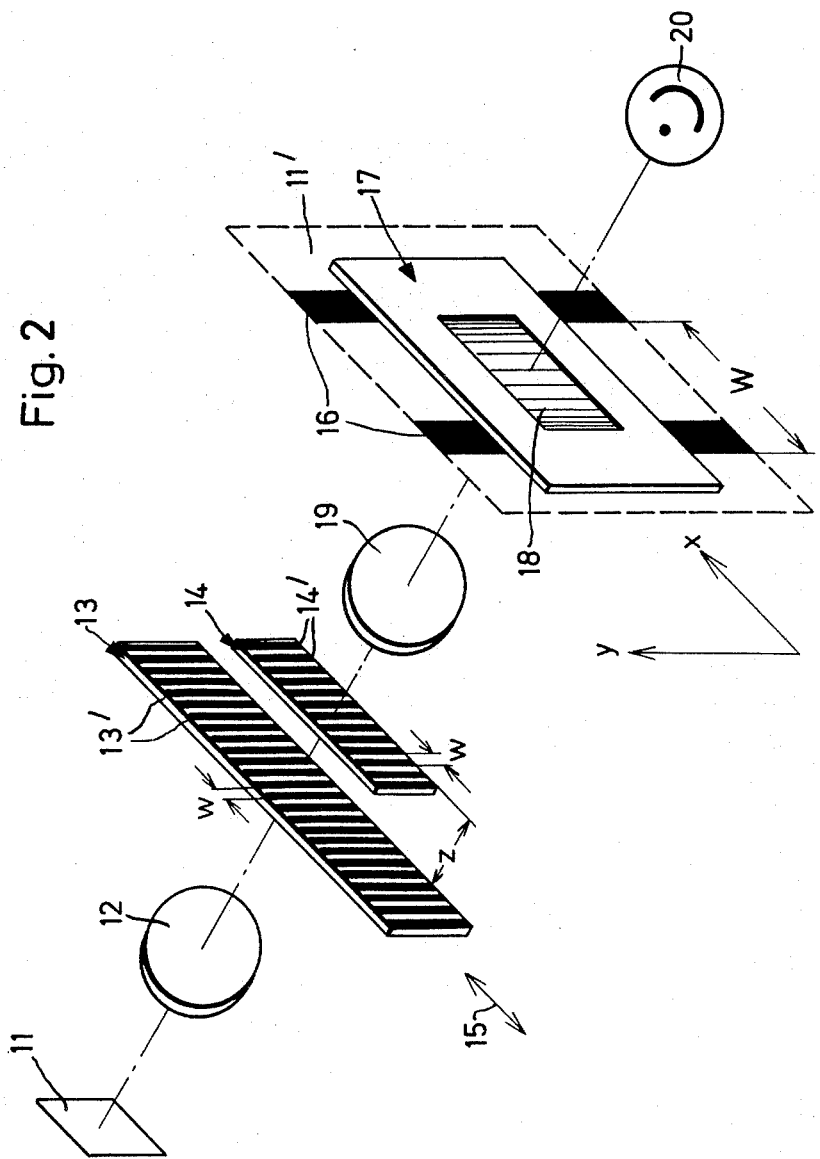

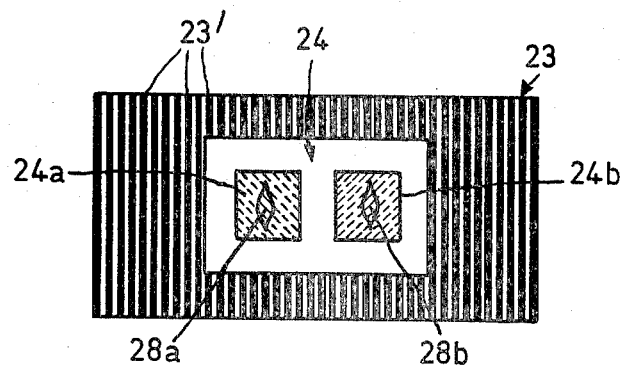
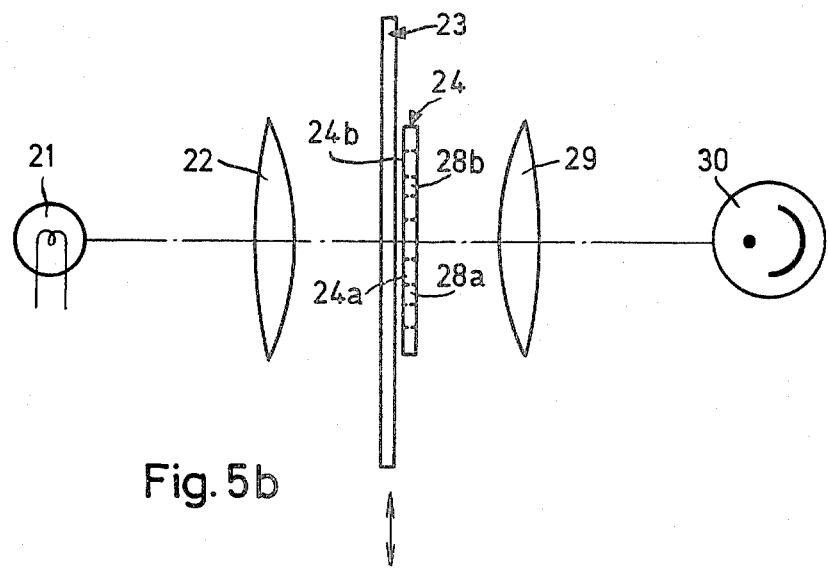

---

3,674,372
MEANS FOR MEASURING POSITION CHANGES OF TWO RELATIVELY MOVABLE MEMBERS
Adolf Weyrauch, Aalen, Germany, assignor to Carl Zeiss-Stiftung, doing business as Carl Zeiss, Wurttemberg, Germany
Filed Aug. 5, 1970, Ser. No. 61,175
Claims priority, application Germany, Aug. 16, 1969, P 19 41 731.3–52
Int. Cl. G01b *11/04*
U.S. Cl. 356—169                                   10 Claims

ABSTRACT OF THE DISCLOSURE

The invention contemplates means using a photoelectric scanning-grating optical system to measure relative displacement, as tracked by relative movement of the respective grating members, and utilizing movement of fringe lines as occasioned by grating-member movement. The invention so combines filter diaphragm means with the grating system, in the region of said fringe lines thereof, that the photocell output signal, as a function of grating displacement, contains only the fundamental wave of the distance period or a single harmonic.

---

The invention relates to means for measuring changes in relative position, as between two relatively movable members. The invention is particularly concerned with such a system wherein the action of a grating-scanning system is photo-electrically evaluated and wherein at least one fringe system of periodic brightness fluctuations is produced.

Devices are known in which the photo-electrically scanned signal is kept substantially free of harmonics by a particular layout of the grating. A disadvantage of these known devices is that all lines of the grating divisions must meet high standards as to uniformity of the line thickness and of the transmission course, of each individual grating line or groove form, as the case may be.

Known electric-filtering techniques cannot be employed with acceptable accuracy in path-measuring instruments, since generally it is not reasonable to expect constant velocity in the relative displacement of the movable members. It is the object of the present invention to obtain in devices of the above-mentioned type a signal which contains only the fundamental wave of the distance period or a single harmonic, without the design of the grating having to meet special requirements and without the necessity of an additional imaging of the gratings on one another.

Other objects and various further features of the invention will be pointed out or will occur to those skilled in the art from a reading of the following specification, in conjunction with the accompanying drawings. In said drawings, which show, for illustrative purposes only, preferred forms of the invention:

FIG. 1 is a simplified isometric diagram schematically showing optical elements embodying the invention;

FIG. 2 is a similar diagram to illustrate another embodiment;

Figure 4A:
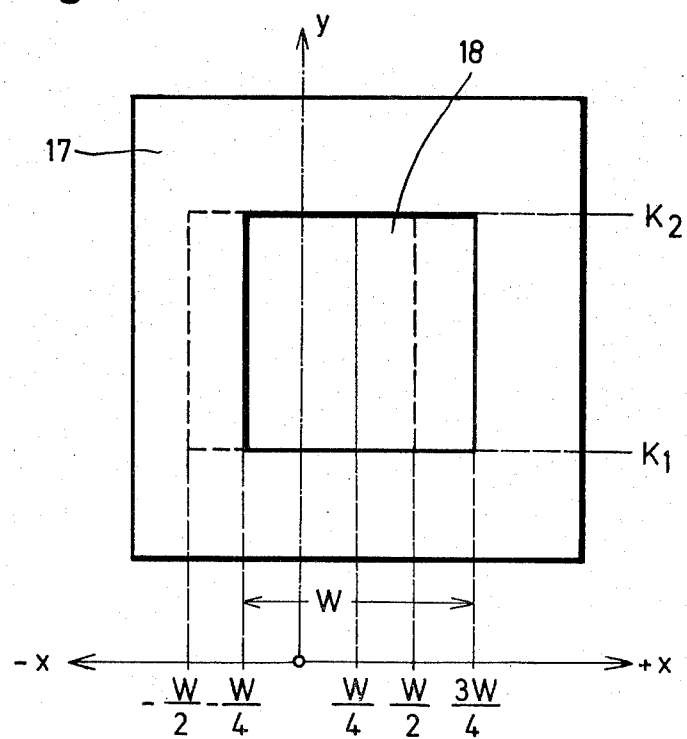
Figure 4B:
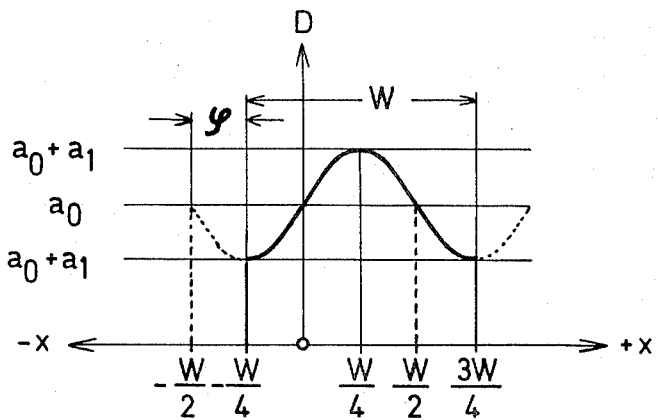

FIGS. 4a and 4b similarly illustrate characteristics of the filter diaphragm of FIG. 2, FIG. 4a being illustrative of dimensional relationships in the plane of the diaphragm, and FIG. 4b being a plot of the light-transmission function of the filter diaphragm of FIG. 2; and FIGS. 5a and 5b illustrate a further modification, FIG. 5a illustrating a two-part scanning grating system, and FIG. 5b illustrating employment of the same in an optical system.

In the arrangement of FIG. 1, a light-source 1 is located in the focal plane of a condenser 2. The collimated-light beam from condenser 2 passes successively two mutually adjacent grating systems 3–4, relatively movable in a direction transverse to the optical axis. In the form shown, the grating system 3 is displaceable in the directions of the double arrow 5 and is rigidly connected to a member (e.g., a machine tool slide), for which displacement is to be measured; the grating system 4 is connected to a stationary member (e.g., the machine bed or frame), with respect to which displacement of the movable member is to be measured.

In FIG. 1 separate heavy dashed lines schematically indicate means for connecting the respective grating systems to parts for which relative displacement is to be observed.

In the present illustrative form, the grating 4 has the same grating constant $w$ as grating 3, but its grating lines 4' are slightly inclined with respect to the grating lines 3' of the grating 3. For the sake of clarity in the drawing, the grating lines have only been shown over the right-hand end regions of gratings 3–4; they will be understood, however, to similarly extend the full width of the gratings.

In the described system of slightly inclined sets of grating lines, so-called moiré fringes (suggested at 6) are formed in a known manner, extending generally transverse to the grating lines 3'–4' of the gratings 3–4. The longitudinal direction of the moiré fringes 6 defines the y-axis of a rectangular-coordinate system. In the region of the moiré fringes, i.e., in their immediate vicinity, a filter diaphragm 7 is mounted in fixed relation to the stationary grating 4; diaphragm 7 has an aperture 8 having a sinusoidal light-transmission characteristic. If grating 3 is moved in the directions of the arrows 5, the moiré fringes are displaced in the x-axis direction of the coordinate system.

A collector 9 converges the transmitted light to a photocell 10. The output of cell 10 is a signal reflecting displacement of the grating 3, due to the fact that x-axis displacement of the moiré fringes causes sinusoidal modulation thereof, by reason of the sinusoidal profile of aperture 8 in the y-axis direction.

In another embodiment (FIG. 2), 11 designates a source from which light is transmitted by a condenser 12, to establish a collimated-light region for the action of relatively movable grating systems 13–14; grating 13 may be connected to a machine element or slide movable along axis 15, and grating 14 may be connected to a stationary part or frame of the machine. On the optical axis, the gratings 13–14 are spaced a finite distance $z$ (i.e., $z \neq 0$), and both gratings have the same or substantially the same grating constant $w$; their grating lines 13'–14' run parallel to each other.

A collector 19 again transmits light passing the gratings 13–14, to a photoelectric cell 20. An interference fringe system 16 is formed in the plane 11' of the diffraction image of the light source, at a band-pass filter diaphragm 17, the latter having a transmission characteristic which varies sinusoidally in the x-axis direction. Filter 17 may, for example, be a graduated gray filter, and, again, the photocell 20 develops an output signal related to the actual displacement of grating 13 along the axis 15.

Operation of the described embodiments will now be explained.

A signal having plural harmonics may be described by the expression:

$$S(v) = a_0 + a_1 \cos 2\pi \left(\frac{v}{w}\right) + \cdots a_n \cos 2\pi n \left(\frac{v}{w}\right) \quad [1]$$

where $v$ denotes relative movement of a grating, $w$ is the period length of the grating, and $a_0$ and $a_n$ are Fourier coefficients reflecting distance between gratings, grating-line inclination, degree of coherence and wavelength of the light.

If a fringe system is produced, whether in the grating plane, as by moiré (e.g., FIG. 1), or in the pupil, e.g., through the diffraction image of the light source (e.g., in FIG. 2, where $z \neq 0$), then the brightness characteristic of the fringe system may be defined by the expression:

$$S(x,v) = a_0 + a_1 \cos 2\pi \left(\frac{x}{W} - \frac{v}{w}\right) \cdots + a_n \cos 2\pi n \left(\frac{x}{W} - \frac{v}{w}\right) \quad [2]$$

where $W$ is the period length of the fringe system, and $x$ is the displaceable position coordinate of the fringe, i.e., perpendicular to the direction of the fringes ($y$-direction). If a diaphragm having a characteristic function $D(x,y)$ is placed in such a fringe system, the photocell output signal is given by the expression:

$$\Phi(V) = \int\int D(x,y) S(x,v) dx dy = \Sigma b_n \cos 2\pi n \left(\frac{v}{w}\right) \quad [3]$$

The $b_n$ values are simply the product of the $a_n$ values, times the corresponding value of the Fourier transform $c_n$ of $D(x,y)$, whereby they may in known manner be expressed as:

$$c_n = \int\int D(x,y) e^{i2\pi n} \left(\frac{x}{W}\right) dx dy \quad [4]$$

If $c_n$ is zero, and for $n = 2, 3, 4$ or a greater integer, the harmonics are suppressed by a filter diaphragm. Such a result may be obtained by a filter diaphragm, as embodied at 7-8 in FIG. 1, by way of example.

The aperture of such a filter diaphragm should meet the following requirements:

(A) $$\Delta y = a_0 + a_1 \sin 2\pi n \left(\frac{x}{W}\right)$$

(B) $D(x,y) = c$, for values of $x$, from $$-m \left(\frac{W}{2} - \varphi\right) \text{ to } +m \left(\frac{W}{2} + \varphi\right)$$

(C) $D(x,y) = 0$, outside the above-stated range.

In the foregoing, $\Delta y$ denotes the characteristic of the width of the diaphragm aperture, in the direction of the fringe system ($y$-direction); $D(x,y)$ is the transmission of the diaphragm; $W$ is the period length of the fringe system; $n$ is an integral number corresponding to the ordinal number of the transmitted wave; $a_0$, $a_1$ are constants where $a_0 \geq a_1$; $c$ is a constant $\geq 1$; $m$ is an integer number corresponding to the number of fringe periods embraced by the band-pass filter diaphragm; and $\varphi$ is the displacement of the filter characteristic, within its displacement limits.

Figure 3A:
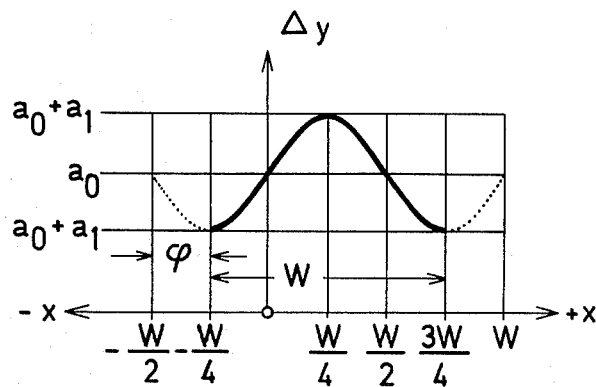
FIG. 3a is a graphical representation of a characteristic of the diaphragm aperture of FIG. 1.
Figure 3B:
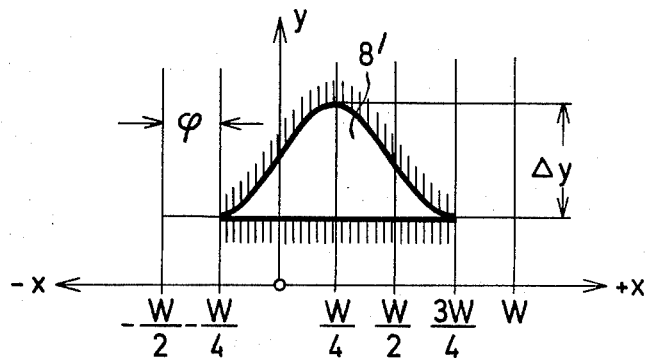
FIGS. 3b and 3c illustrate alternative profiles for the diaphragm aperture of FIG. 1, plotted to show the relation between aperture width and fringe period.
Figure 3C:
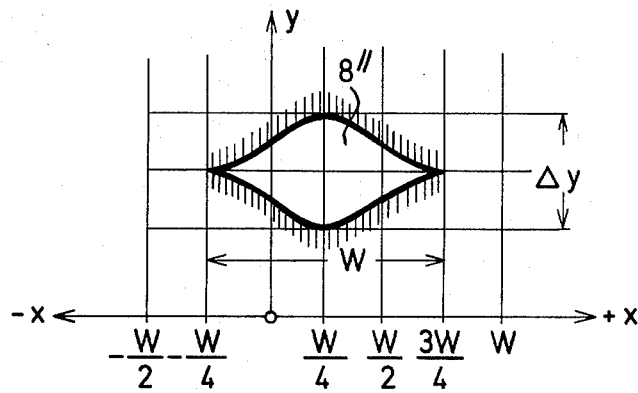
Figure 3D:
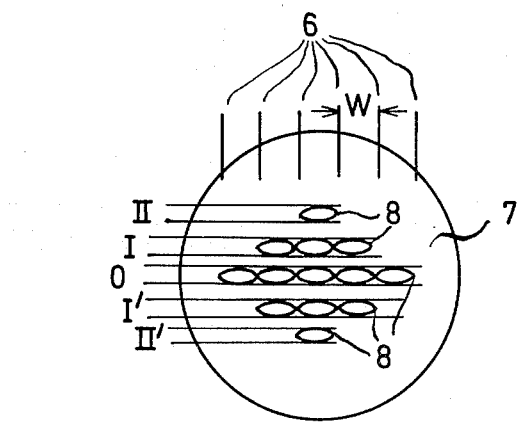
FIG. 3d is a schematic diagram to illustrate a band-pass filter diaphragm with plural diaphragm apertures.

For a better understanding of these conditions, reference is made to FIGS. 3a to 3d, in which FIG. 3a shows the diaphragm-aperture characteristic, $\Delta y$, according to expression (A) above; FIGS. 3b and 3c show alternative diaphragm-aperture profiles 8' and 8'', respectively, corresponding to such a characteristic, where the displacement range ($\varphi$) of the filter characteristic is $W/4$, for example; and FIG. 3d depicts a band-pass filter diaphragm with an array of plural apertures 8 each of which is operative over a fringe-period length W. In FIG. 3d, for example, at the "Zone-O" level, $m = 5$; at the level of "Zone-I" and "Zone-I'," $m = 3$; and at the level of "Zone-II" and "Zone-II'," $m = 1$.

In another embodiment of the filter diaphragm, as in FIG. 2 for example, the parts 17-18 will be described in connection with FIGS. 4a and 4b.

The rectangular pass band 18 of diaphragm 17 (FIG. 4a) has a width (in the $x$-direction) equal to the period of length W of the fringe system. The height of the transmission window (in the $y$-direction) is defined between limits $K_1$ and $K_2$. This transmission window has a sinusoidal transmission characteristic (D) in the $x$-direction; and outside this window 18, transmission is blocked (i.e., is zero), as suggested by the dashed-line extensions of the ends of the sinusoidal characteristic in FIG. 4b.

Expressed by formula, the transmission characteristic D should be of the following nature:

$$D(x,y) = a_0 + a_1 \sin 2\pi n \left(\frac{x}{W}\right)$$

for values of $x$ ranging from $$-m \left(\frac{w}{2} - \varphi\right) \text{ to } +m \left(\frac{W}{2} + \varphi\right)$$

and for values or $y$ ranging from $K_1$ to $K_2$.

$D(x,y) = 0$, outside the stated range.

The meaning of these symbols has already been given and is evident in the context of the figures in the drawings.

It will be understood that a filter diaphragm of the invention may also be constructed as a combination of two general types which have been descrbied by way of illustration, and, of course, the invention lends itself to further modification.

It will be appreciated that strict separation of the fundamental wave or any single harmonic requires that the period length W of the fringe system be held constant. However, due to unavoidable tolerance variations, which may cause slight additional inclination (rotary displacement) of the movable grating with respect to the stationary scanning grating, there is a risk that slight variations in the period length W may occur during the measurement. This possible error can be compensated, in accordance with a further feature of the invention, which will be discussed in reference to FIGS. 5a and 5b.

FIG. 5a shows a two-part scanning grating 24, cooperating with a movable grating system 23. Grating 24 comprises two laterally spaced panels 24a-24b having grating lines of the same grating constant, but inclined equally and symmetrically with respect to the direction of grating lines 23' of the movable system 23. In this manner, two moiré fringe systems are established (one for each scanning panel), and each of these is employed with a filter diaphragm according to the invention; in FIG. 5a, it is suggested for example, that the respective filter diaphragms 28a-28b can be applied directly to the scanning gratings 24a-24b.

In FIG. 5b, it is seen that the grating system 23-24 is irradiated with collimated light from source and condenser means 21-22, to produce two fringe systems, and the photoelectric cell output at 30 reflects diaphragm action, at 28a and 28b alike, as collected at 29.

In any rotation of grating 23 with respect to grating 24, about an axis perpendicular to the drawing plane of FIG. 5a, the angles of inclination of the partial gratings vary by opposite but equal amounts, meaning that the related period lengths W of the two fringe systems thus also vary to opposite but equal extent. Since both partial scannings are added in the same photocell 30, it follows that these variations compensate each other.

What is claimed is:

1. Apparatus for measuring position change of two parts moving with respect to each other, comprising a photoelectric grating-scanning system with relatively movable gratings intersecting an optical axis and wherein at least one fringe system is developed from periodic brightness fluctuations of light passing through said gratings at a further region along said axis, part-connecting means for each of said gratings, whereby a direction of fringe movement is established at said region for a given relative movement of said gratings, and filter diaphragm means in the region of development of said fringe system and having a sinusoidal light-transmission characteristic oriented in the direction of fringe movement at said region.

2. Apparatus according to claim 1, in which said diaphragm means includes a mask and has an aperture with two profiled inner edges, said edges being spaced from each other in accordance with a profile pattern which varies sinusoidally.

3. Apparatus according to claim 2, in which one of said edges is straight and the other is sinusoidally characterized.

4. Apparatus according to claim 2, in which both said edges are sinusoidally characterized, in opposed-phase relation.

5. Apparatus according to claim 1, in which said grating-scanning system comprises two similarly-lined and linearly movable gratings, one of said gratings being slightly inclined with respect to the other, whereby, in the course of grating movement, fringe-line modulation of light passing the aperture reflects fringe movement.

6. Apparatus according to claim 1, in which said diaphragm means includes a mask with a window having a variable-density filter of transmission character which varies sinusoidally as a function of said direction of fringe movement.

7. Apparatus according to claim 1, in which said filter diaphragm means has an aperture substantially meeting the edge-profile characteristic:

$$\Delta y = a_0 + a_1 \sin 2\pi \frac{x}{W}$$

over a limited range of $x$-values in the functional relationship $D(x,y) = c$, namely, over the range of $x$-values extending from $$-m\left(\frac{W}{2} - \varphi\right) \text{ to } +m\left(\frac{W}{2} + \varphi\right)$$

$x$-values in $D(x,y)$ being zero outside said range; where:

$\Delta y$ is maximum effective span of the diaphragm aperture in the direction of the fringe system,
$D(x,y)$ is the transmission characteristic of the diaphragm,
$W$ is the period length of the fringe system,
$n$ is an integer number corresponding to the transmitted wave,
$a_0, a_1$ are constants,
$c$ is a constant,
$m$ is an integer number corresponding to the number of fringe periods embraced by the diaphragm, and
$\varphi$ is the displacement of the filter characteristic between its displacement limits.

8. Apparatus according to claim 1, in which said filter diaphragm means has a range of variation of light transmission, which range varies substantially in accordance with the expression:

$$D(x,y) = a_0 + a_1 \sin 2\pi n \left(\frac{x}{W}\right)$$

for values of $x$ ranging from $$-m\left(\frac{W}{2} - \varphi\right) \text{ to } +m\left(\frac{W}{2} + \varphi\right)$$

for values of $y$ ranging from $K_1$ to $K_2$, and for $$D(x,y) = 0$$

beyond the said ranges; where:

$D(x,y)$ is the transmission characteristic of the diaphragm,
$W$ is the period length of the fringe system,
$n$ is an integer number corresponding to the transmitted wave,
$a_0, a_1$ are constants,
$c$ is a constant,
$m$ is an integer number corresponding to the number of fringe periods embraced by the diaphragm,
$\varphi$ is the displacement of the filter characteristic between its displacement limits, and
$K_1$ and $K_2$ are limits of transmission capability in the direction transverse to the direction of grating displacement.

9. Apparatus according to claim 1, in which said grating-scanning system includes a first member with a set of granting lines thereon, and a second grating member having two like fixedly spaced inclined gratings each of which is inclined equally and oppositely to the orientation of grating lines of said first grating, and separate filter diaphragm means serving light passed by each of said inclined gratings.

10. Apparatus according to claim 1, in which said grating-scanning system comprises two gratings which are spaced a finite distance, said gratings having the same or substantially the same grating constant and their grating lines running parallel to each other.

References Cited

UNITED STATES PATENTS

| | | | |
|---|---|---|---|
| 3,553,470 | 1/1971 | Dench et al. | 250—237 G |
| 3,216,318 | 11/1965 | Gafford | 350—162 SF |
| 3,488,512 | 1/1970 | La Roche | 356—169 |

OTHER REFERENCES

"Achromatic Sine-Wave Generator" by Lohmann, IBM Tech. Discl. Bul., vol. 10, #1, June 1967, p. 56.

"The Moiré Phenomenon," by M. Stecher, Amer. J. of Physics, Vol. 32, #4, April 1964 pp. 247-57.

RONALD L. WIBERT, Primary Examiner

J. ROTHENBERG, Assistant Examiner

U.S. Cl. X.R.

250—237 G; 350—162 R, 162 SF; 356—172